(12) United States Patent
Sorstrom et al.

(10) Patent No.: US 10,683,626 B2
(45) Date of Patent: Jun. 16, 2020

(54) DEVICE AND METHOD FOR DISPERSING OIL ON WATER

(71) Applicant: SINVENT AS, Trondheim (NO)

(72) Inventors: Stein Erik Sorstrom, Trondheim (NO); Trond Nordtug, Jakobsli (NO)

(73) Assignee: SINVENT AS, Trondheim (NO)

( * ) Notice: Subject to any disclaimer, the term of this patent is extended or adjusted under 35 U.S.C. 154(b) by 0 days.

(21) Appl. No.: 16/207,621

(22) Filed: Dec. 3, 2018

(65) Prior Publication Data

US 2019/0145074 A1 May 16, 2019

Related U.S. Application Data

(63) Continuation-in-part of application No. 15/603,920, filed on May 24, 2017, now abandoned, which is a
(Continued)

(30) Foreign Application Priority Data

Oct. 10, 2012 (NO) .................................. 20121147

(51) Int. Cl.
| | | |
|---|---|---|
| *E02B 15/04* | (2006.01) | |
| *B05B 1/30* | (2006.01) | |
| *B05B 1/04* | (2006.01) | |
| *B05B 3/02* | (2006.01) | |
| *B05B 1/20* | (2006.01) | |
| *B05B 1/34* | (2006.01) | |
| *B63B 35/32* | (2006.01) | |

(52) U.S. Cl.
CPC .............. *E02B 15/041* (2013.01); *B05B 1/04* (2013.01); *B05B 1/20* (2013.01); *B05B 1/3006* (2013.01); *B05B 1/3405* (2013.01); *B05B 3/02* (2013.01); *E02B 15/046* (2013.01); *B63B 35/32* (2013.01)

(58) Field of Classification Search
CPC ...... E02B 15/04; E02B 15/041; E02B 15/046; B63B 35/32; B05B 1/20; B05B 1/3405; B05B 3/02; B05B 13/005; B05B 15/68
USPC ........ 210/747.5, 747.6, 776, 170.05, 170.09, 210/170.11, 242.3, 923
See application file for complete search history.

(56) References Cited

U.S. PATENT DOCUMENTS

| 1,202,051 A | 10/1916 | Gibbons |
|---|---|---|
| 3,532,622 A | 10/1970 | McNeely |

(Continued)

FOREIGN PATENT DOCUMENTS

| CN | 2772629 Y | 4/2006 |
|---|---|---|
| EP | 1020566 | 7/2000 |

(Continued)

OTHER PUBLICATIONS

International Search Report dated Jan. 7, 2014 in corresponding International Application No. PCT/NO2013/050168.
(Continued)

*Primary Examiner* — Christopher Upton
(74) *Attorney, Agent, or Firm* — Wenderoth, Lind & Ponack, L.L.P.

(57) ABSTRACT

A device and method for dispersing oil on water comprises a rig structure for being mounted in a vessel, the rig structure including a front transverse structure with at least one nozzle for flushing with pressurized water supplied from a pressure facility located on the vessel.

16 Claims, 17 Drawing Sheets

Related U.S. Application Data continuation-in-part of application No. 14/433,206, filed as application No. PCT/NO2013/050168 on Oct. 7, 2013, now abandoned.

(56) References Cited

U.S. PATENT DOCUMENTS

| | | |
|---|---|---|
| 3,762,169 A | 10/1973 | Graham |
| 4,033,869 A | 7/1977 | McGrew |
| 4,182,679 A | 1/1980 | Van Hekle |
| 4,222,868 A | 9/1980 | Kuris |
| 4,228,668 A | 10/1980 | Scherbing |
| 4,425,240 A | 1/1984 | Johnson |
| 5,490,940 A | 2/1996 | Bragg et al. |
| 6,517,726 B2 | 2/2003 | Allen |
| 6,533,195 B2 | 3/2003 | Sinders |
| 2012/0039669 A1 | 2/2012 | Claeson |
| 2013/0277444 A1* | 10/2013 | Hartland ............... E02B 15/041 239/176 |
| 2015/0218768 A1 | 8/2015 | Sorstrom |

FOREIGN PATENT DOCUMENTS

| | | |
|---|---|---|
| FR | 2 694 737 | 2/1994 |
| GB | 2 038 651 A | 7/1980 |
| GB | 2 160 190 A | 12/1985 |
| WO | 81/02693 | 10/1981 |

OTHER PUBLICATIONS

Norwegian Search Report dated May 10, 2013 in corresponding Norwegian Application No. 20121147.
Supplementary European Search Report dated May 4, 2016 in corresponding European Application No. 13 84 4664.

* cited by examiner

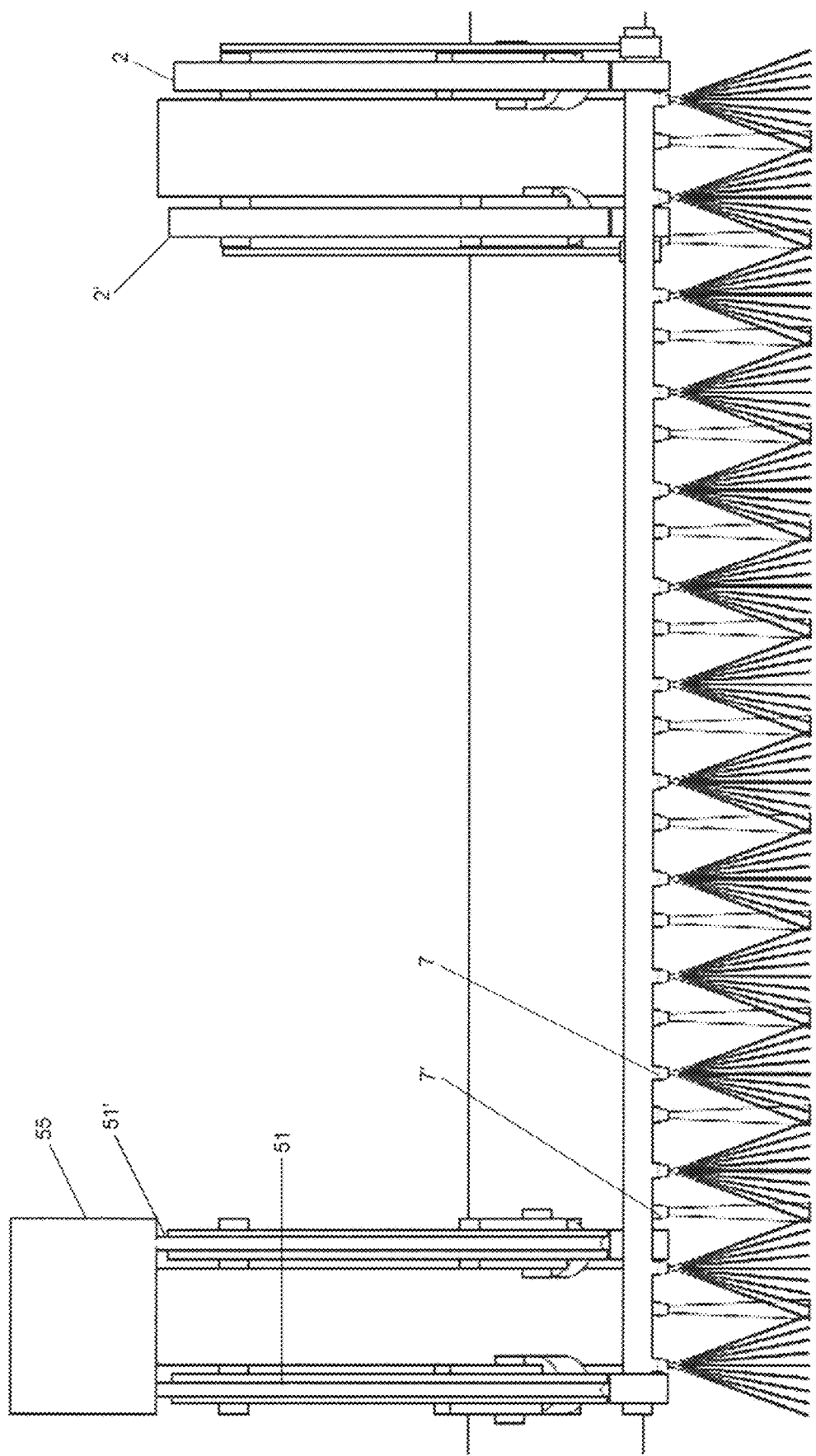

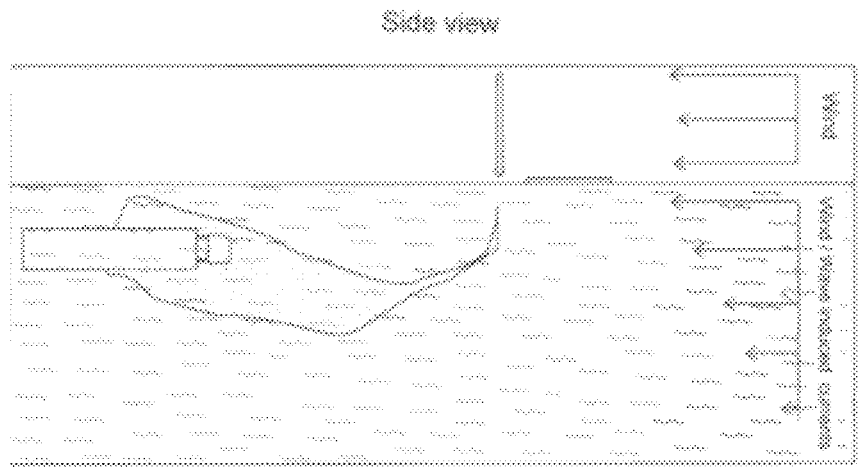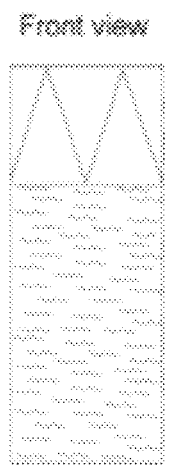
FIG. 9a  FIG. 9b
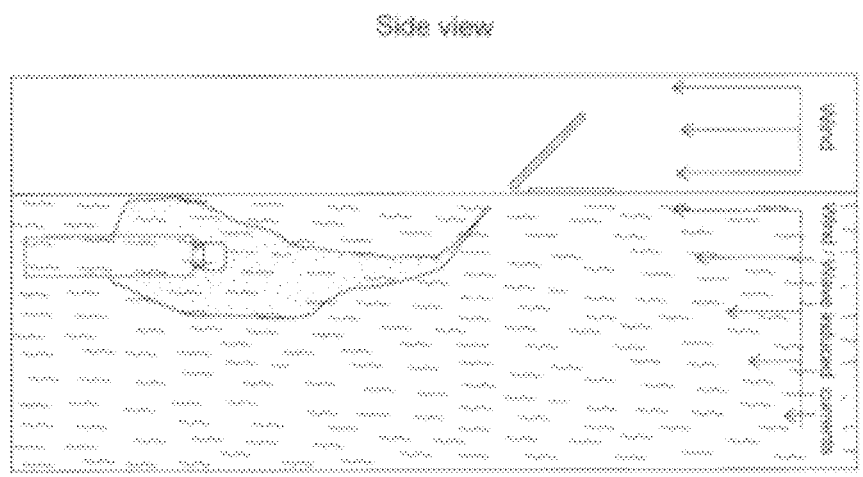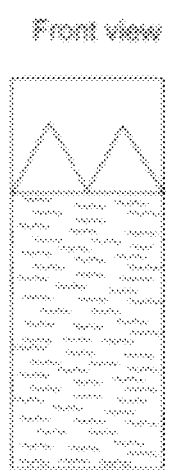
FIG. 10a  FIG. 10b

DEVICE AND METHOD FOR DISPERSING OIL ON WATER

BACKGROUND OF THE INVENTION

1. Field of the Invention

The present invention relates to a device and method for dispersing oil on water.

More particularly, the present invention relates to the chemical-free dispersion of oil on water.

2. Description of Related Art

Oil spills in connection with discharges from the oil industry, shipping industry, etc. pose a severe environmental problem which may lead to catastrophic consequences. Recent examples of oil spills are the blowout of BP's well in the Gulf of Mexico and the spill from the ship Full City outside of Langesund.

The alternatives presently available for handling such spills, preferably offshore, are the following: 1. mechanical collection of oil on water, 2. in-situ burning of oil on water, and 3. chemical dispersion of oil on water.

The choice between these three techniques is based in part on national as well as local legislation and on a number of practical, environmental, and legislative considerations for each individual spill incident. The selection of preferred countermeasures is often dictated by what is feasible and acceptable under the prevailing conditions.

The chemical dispersion of oil on water is a commonly used oil spill control method. The method involves spraying "dispersant(s)" onto the oil slick floating on the surface, which is thereby dispersed into microscopic (micron-sized) droplets. These droplets are distributed in the water column either by way of natural turbulence (waves and current) or by using the propulsion system of a ship. Subsequently, naturally occurring currents and turbulence in the water will help dilute the oil slick so as to render the oil slick less damaging or even harmless to the environment. In this regard, it should be noted that during the spill in the Gulf of Mexico, several thousand metric tons of chemicals were applied to the oil slick, and accordingly, the use of chemical dispersion of oil on water is controversial as the application of chemicals on oil slicks adds additional pollutants to the sea.

The use of chemicals is limited by the availability of the chemicals, the effectiveness of the chemicals, and the actual grade of the oil, as well as the application technology available. In spite of these considerations, chemical dispersion is a commonly used technique and is regarded as the dominant and most important technique in connection with most oil spill catastrophes all over the world.

The following disadvantages and limitations with the use of chemical dispersion should be mentioned:

The dispersant contains ingredients that are detrimental to the environment.

Relatively large amounts of dispersant are used in a contingency operation. The dispersant must be transported to the application site, which is often a limiting factor in the execution of the operation.

After some time on water, the oil changes properties, and as a result, will no longer be chemically dispersible (it becomes viscous and absorbs water, which reduces or eliminates the feasibility of chemical dispersion).

Public opinion (various interest groups) is often opposed to the use of chemicals, such that the method is disputed.

It should also be noted that methods and arrangements for minimizing the use of dispersants exist. In this regard, reference is made to U.S. Pat. No. 4,222,868 A, in which oil and water is homogenized through the use of ultrasound energy to minimize the use of dispersants. The oil is mixed into the water body, and in this manner, the damage is significantly reduced.

GB 2038651 A discloses a method of dispersing oil in water by means of ultrasound vibrations. Several vibration generating apparatuses are installed on a vessel. It is also suggested that the vibration generating apparatuses are used together with a solvent.

FR 2694737 discloses a catamaran for cleaning water, having a ramp with adjustable nozzles. The main purpose of the equipment is to collect floating waste, using fluid in the nozzles which is selectable from water, air, or dispersants.

U.S. Pat. No. 3,532,622 A discloses and claims the use of chemical dispersants in order to form an oil-in-water dispersion. The spray nozzles are disposed at a significant distance from the water surface at which spilled oil is to be treated. High pressure nozzles, instead of fan pumps, are used for emulsifying the oil to small droplets and the gradation of the jets directly in proportion to the concentration of oil is accomplished through a constant laterally oscillating angular movement of the jets.

SUMMARY OF THE INVENTION

An object of the present invention is to provide a new and efficient solution for handling oil spills on water, preferably offshore.

A second object is that the solution is to be environmentally friendly and hence not discharge environmentally harmful substances into the surrounding water body, i.e., the present solution shall be free of chemicals.

A third object is that the solution for handling oil spills on water, i.e., oil slicks, shall be simple and cost-efficient. The arrangement needed for handling the oil spills is to be simple and inexpensive to produce and also have low operating costs in use. Operation of the device shall be simple and efficient with respect to handling of large volumes of oil spills.

A fourth object is that the device shall have a flexible configuration so that it can be used on many different vessels, i.e., both on specially designed vessels and on conventional vessels.

The objects of the present invention are achieved by a device for dispersing oil on water, comprising a rig structure for being mounted in a vessel, the rig structure including a transverse structure with nozzles for flushing with pressurized water jets supplied from a pressure facility located on the vessel, wherein a direction and a distance of the nozzles to a surface of the water as well as pressure of the pressurized water are adjustable, wherein the nozzles are rotatably arranged whereby overlapping impact areas from closely related nozzles are formed on the surface of the water, whereby dispersed oil droplets within a micron-size range are obtained such that the dispersed oil droplets can be mixed into the water by the energy created by the water jets and forward motion of the vessel.

Preferred embodiments of the device are set forth in more detail herein.

The objects of the present invention are further achieved by a method of dispersing oil on water, comprising mounting a rig structure in a vessel, wherein the rig structure includes a front transverse structure with rotatable nozzles for flushing with pressurized water jets supplied from a pressure facility located on the vessel, adjusting a direction and a distance of the nozzles to the a surface of the water as well as pressure of the pressurized water, maintaining highest possible impact energy from the pressurized water on the surface in relation to the viscosity of oil, and obtaining dispersed oil droplets within a micron-size range such that the dispersed oil droplets are mixed into the water by the energy created by the water jets and forward motion of the vessel.

BRIEF DESCRIPTION OF THE DRAWINGS

In the following description, embodiments of the present invention will be explained with reference to the attached drawings, in which:

FIG. 2a shows a front view of a second embodiment of the device during operation, FIG. 9a shows the experiment setup in the meso-scale flume, in a side view, with application at an angle of 90 degrees from a height of 50 cm, FIG. 9b shows a front view of FIG. 9a, FIG. 10a shows the experiment setup in the meso-scale flume, in a side view, with application at an angle of 45 degrees from a height of 25 cm, FIG. 10b shows a front view of FIG. 10a, FIG. 11a shows the experiment setup in the meso-scale flume, in a side view, with application at an angle of 90 degrees from surface level (zero height)

DETAILED DESCRIPTION OF THE INVENTION

Figure 3:
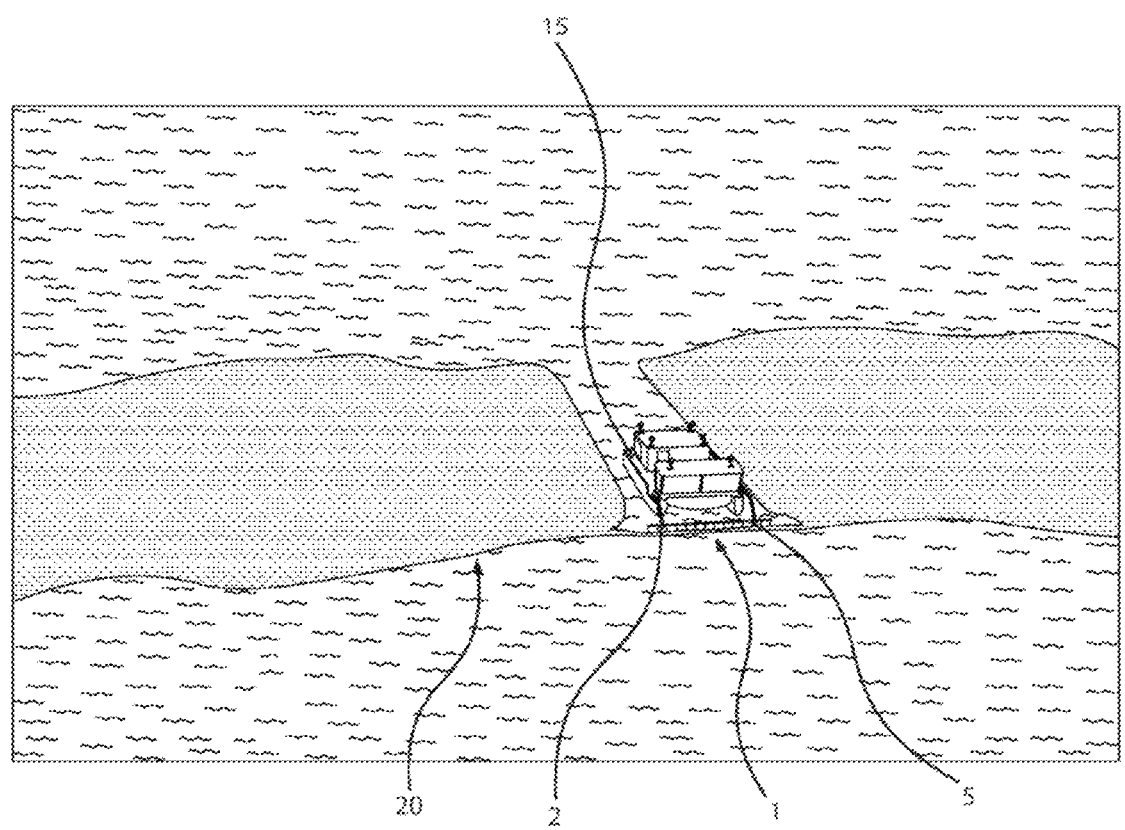

Referring to the drawings, embodiments of the invention in the form of a device 1 and method for dispersing oil 20 on water will be explained. A first embodiment of the device 1 includes a rig structure 2 for being mounted preferably in a front part of a vessel 15. Rig structure 2 further includes a front transverse structure 5. Preferably, the front transverse structure 5 spans the entire width of the vessel. FIG. 3 shows an embodiment of the front transverse structure 5 having an extent that exceeds the width of the vessel so that it will cover an area wider than the width of the ship. In this connection, it is also noted that in other embodiments, the transverse structure 5 may have an extent smaller than the width of the vessel. The transverse structure 5 is further provided with a number of nozzles 7, 7' for flushing with high pressure water 11 supplied from a high pressure facility 10 located on the vessel 15. In this connection, it should be noted that the number of nozzles 7, 7' may vary depending the configuration of the nozzle(s) and area of application, for example.

Preferably, high pressure facility 10 will use water from the surrounding water body, which may be seawater or freshwater depending on the location at which the vessel operates. High pressure facility 10 further uses a pressure generator whereby water is provided at ultra-high pressure to nozzles 7, 7'.

In the present case, rig structure 2 is shown moveably mounted to the vessel whereby the distance from the water surface of nozzles 7, 7' is adjustable. The direction of nozzles 7, 7' and the pressure of the high pressure water are also adjustable so that dispersed oil droplets within a preferred or optimum micron-size range of, preferably, 5-40 μm are obtained.

It is noted that rig structure 5 could also be provided with pneumatic and ultrasound arrangements that further increase the oil dispersion efficiency.

Figure 1:
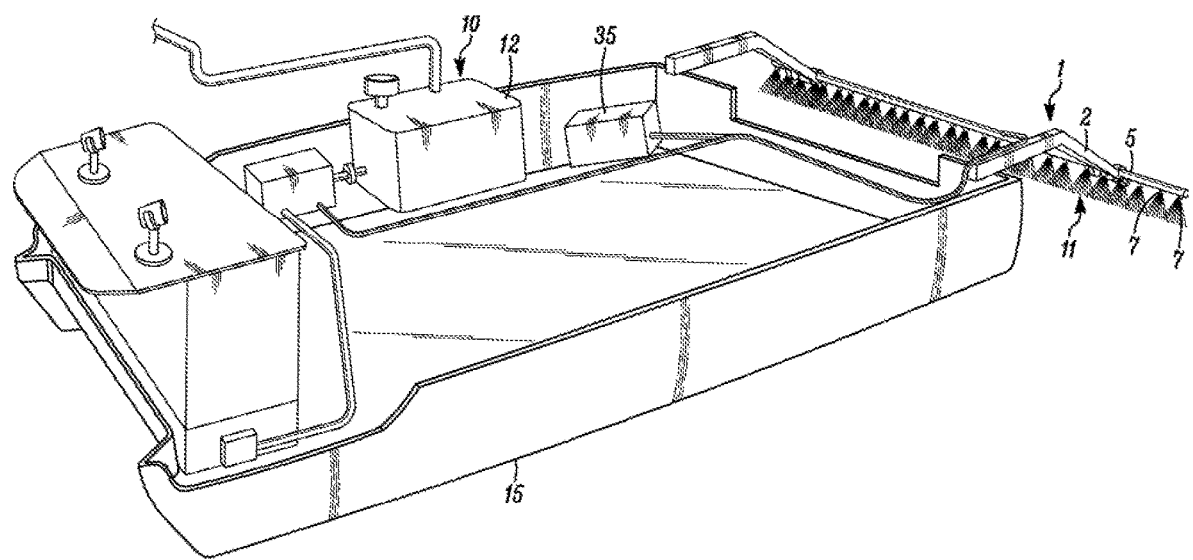
FIG. 1 schematically shows first embodiment of a device for dispersing oil on water mounted in a front part of a vessel.

Referring to FIG. 1, rig structure 2 is further connected to an additive storage tank 35. As shown in the figure, additives are carried directly from storage tank 35 into high pressure water 11 for nozzles 7, 7'. It should be noted, however, that the additives could be carried directly from storage tank 35 to suitable additive nozzles provided on the front transverse structure 5. A combination of directly supplying the additives into high pressure water for the nozzles and supplying to separate additive nozzles provided on the transverse structure 5 is also contemplated. In order to achieve a mechanical impact, particles must be carried directly from a storage tank into the water flow to the nozzles. In principle, other additives could be sprayed from separate nozzles without involving the high pressure water 11 for nozzles 7, 7'. The additives or materials can be particles, bacteria, nutrients, etc.

In the case of handling an oil spill on water, the vessel will be prepared for operation in that rig structure 2 and nozzles 7, 7' as well as the pressure of the high pressure water are adjusted and regulated and optimized so as to obtain dispersed oil droplets of the desired micron-range size.

Figure 2:
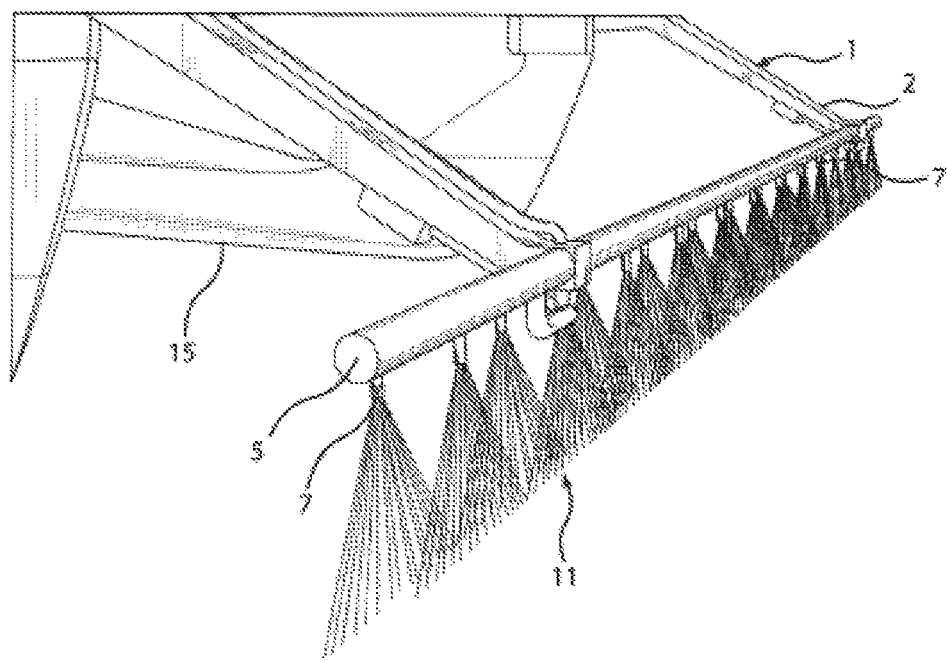
FIG. 2 shows a more detailed view of the device during operation.
Figure 2B:
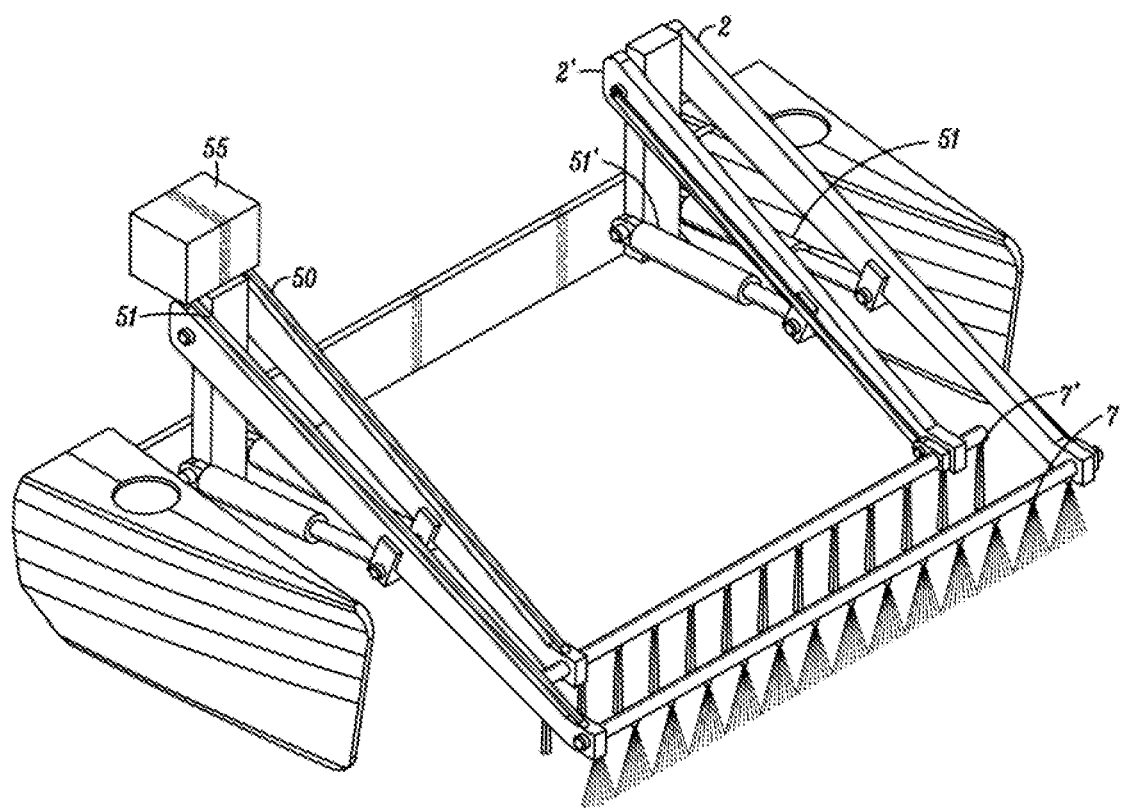
FIG. 2b shows further details of the device according to FIG. 2a, FIG. 3 shows the vessel with the device in operation for handling an oil spill on water.

With reference to FIGS. 2a and 2b a second embodiment of the device 1 will be explained.

Water with high pressure is supplied through separate hoses 50, 50', one for each set of nozzles 7, 7'.

The narrow nozzles 7' are mounted on the rig structure 21 and operated by a first hydraulic regulated arm while the wider nozzles 7 are mounted on the rig structure 2 and operated by a second hydraulic regulated arm.

A water switch 55 makes it possible to select one or both of the nozzle sets.

Two or several sets of nozzles 7, 7' are used. The first set gives a narrow water jet with high impact energy. The water jet from these nozzles 7' penetrates deep into the water column (1-2 meter).

The second set of nozzles 7 gives a wider water jet covering a larger surface area. The water jet from these nozzles 7 penetrates down to 0.5-1 meter depth.

The narrow nozzles 7' are positioned such that the water jets from the narrow nozzles 7' hits the surface at the midpoint between the impact areas of the wider set of nozzles 7.

The angle between the water jet and the surface may be regulated by twisting the nozzle arm in the desired direction.

The two nozzle sets are mounted on their own movable arm where the distance over the water surface can be regulated individually by use of hydraulic pistons 51, 51' one each of the separate arms.

It is possible to increase the number of nozzles 7, 7' by adding two or more sets of nozzles 7, 7' on each of the nozzle arms.

FIG. 3 shows the vessel 15 with the device 1 during operation for dispersing oil 20 on water (an oil slick). By means of device 1, the oil is dispersed into oil droplets within a micron-size range at the front of the vessel. The oil droplets will be further mixed into the water body by the forward movement of the vessel. The result thereof is that the oil slick is broken into micron-size droplets, after which natural currents and turbulence in the water body further help diluting the oil cloud so that it becomes less damaging or even harmless to the environment.

Figure 4:
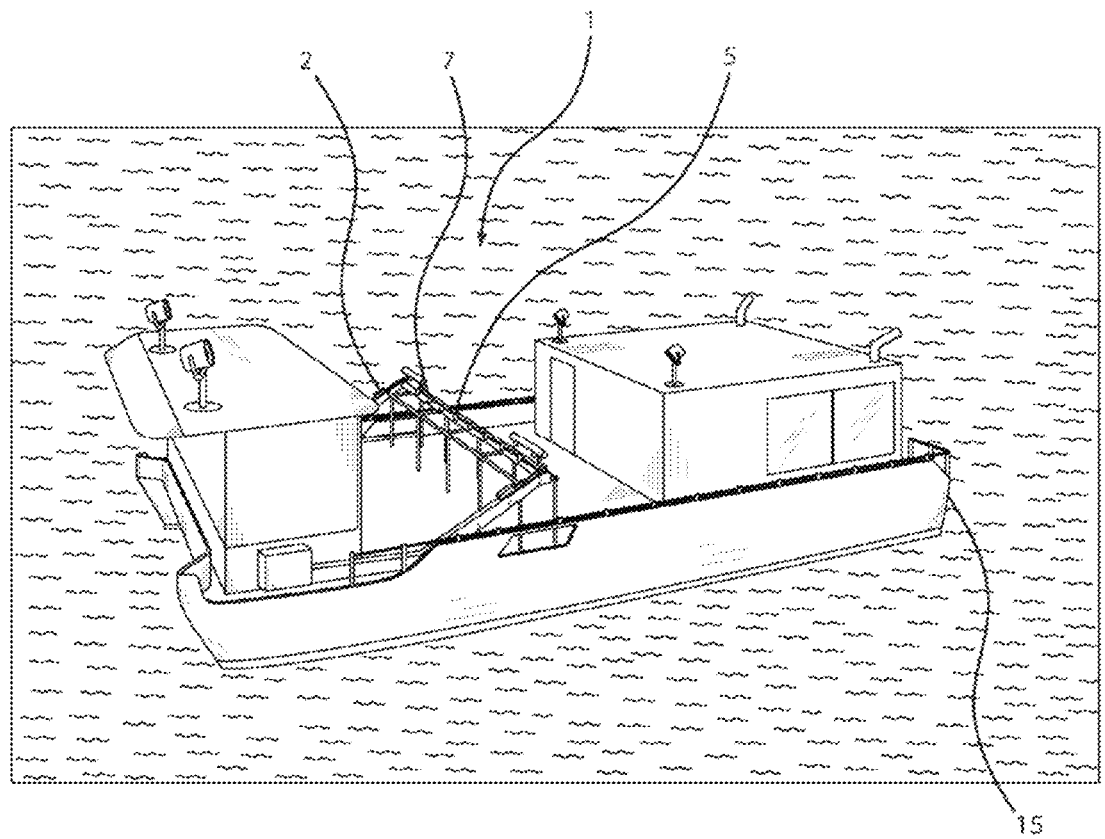
FIG. 4 shows the vessel with the device in a non-operative position, in a transport configuration, for example, FIG. 5 schematically shows initial tests in a plexiglass tube.

FIG. 4 shows the vessel 15 with the device 1 in a non-operative configuration during transport to the operation site or to shore, for example.

Figure 13:
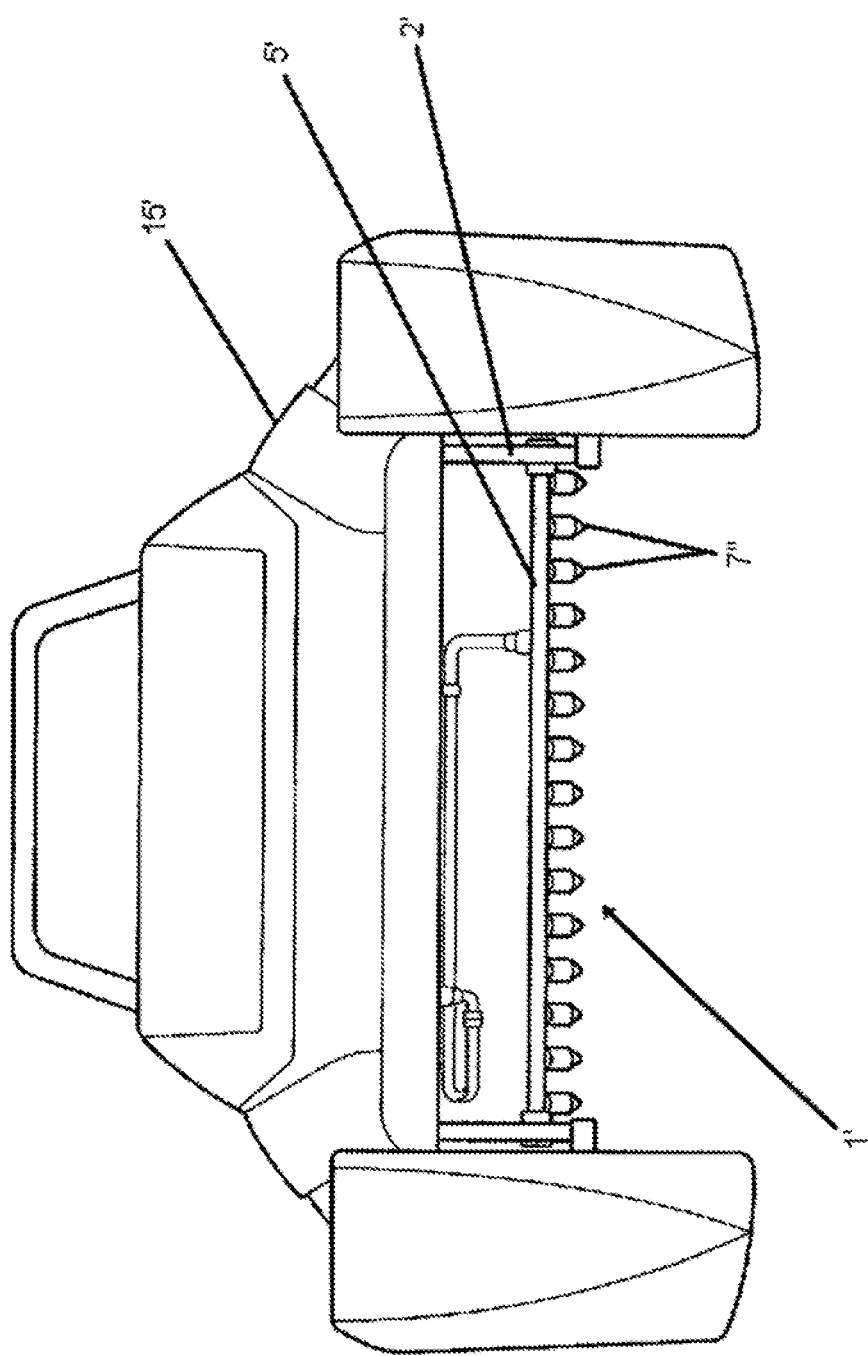
FIG. 13 shows a front view of a vessel with a preferred embodiment of the device for dispersing oil on water.
Figure 14:
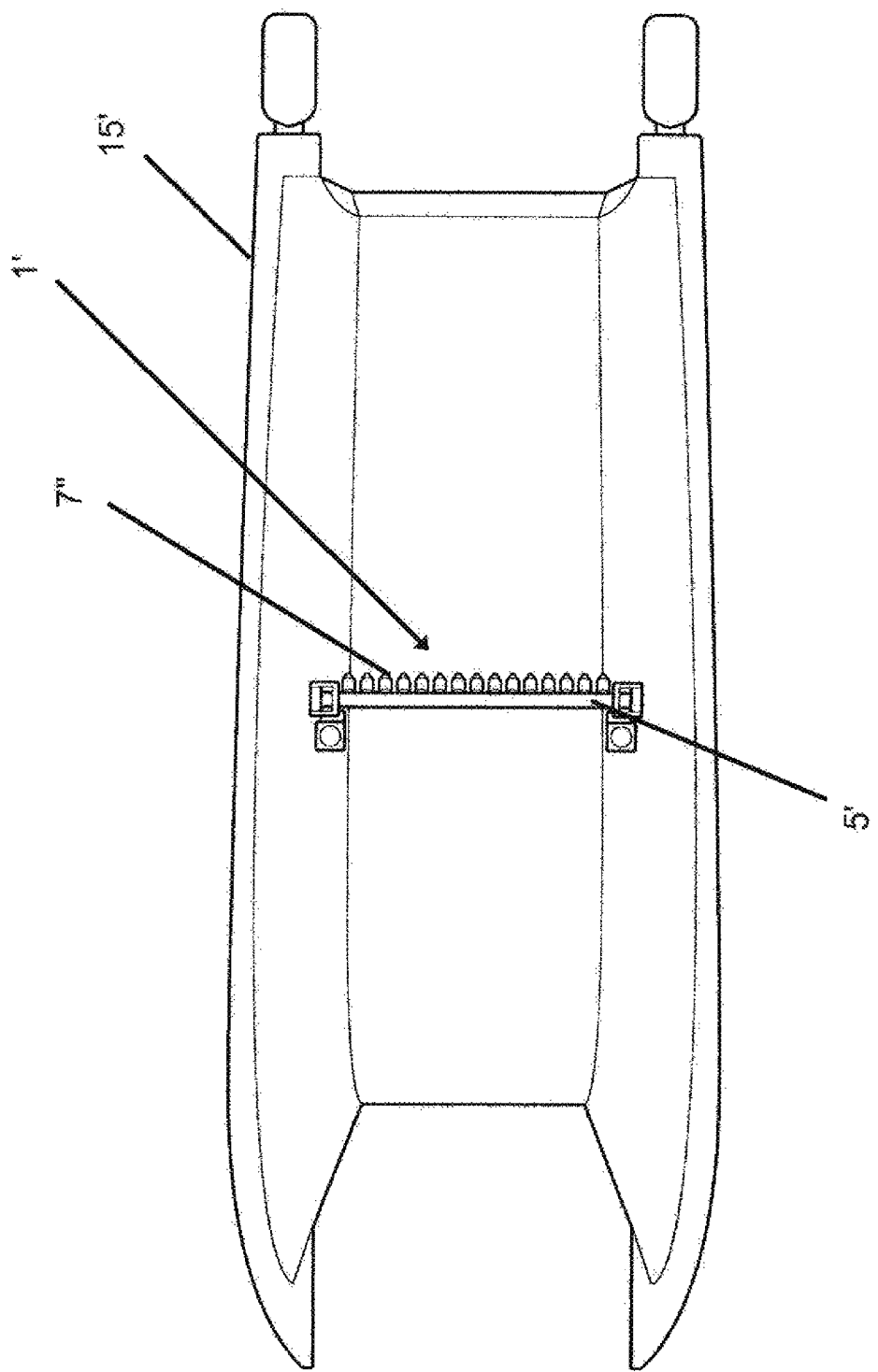
FIG. 14 shows a top view of the vessel of FIG. 13.
Figure 15:
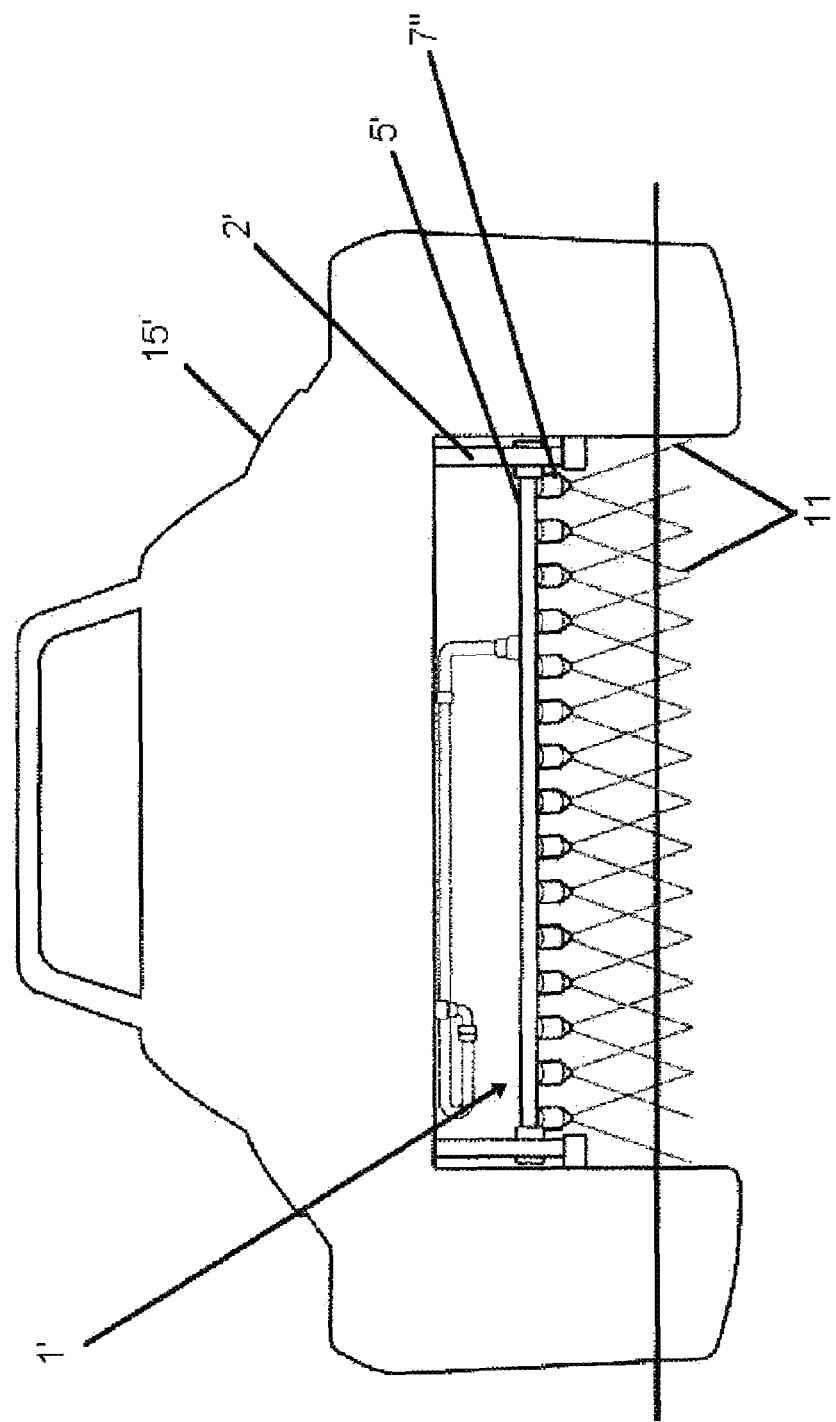
FIG. 15 shows a front view of the vessel according to FIGS. 13 and 14 in operation for handling an oil spill on water.
Figure 17:
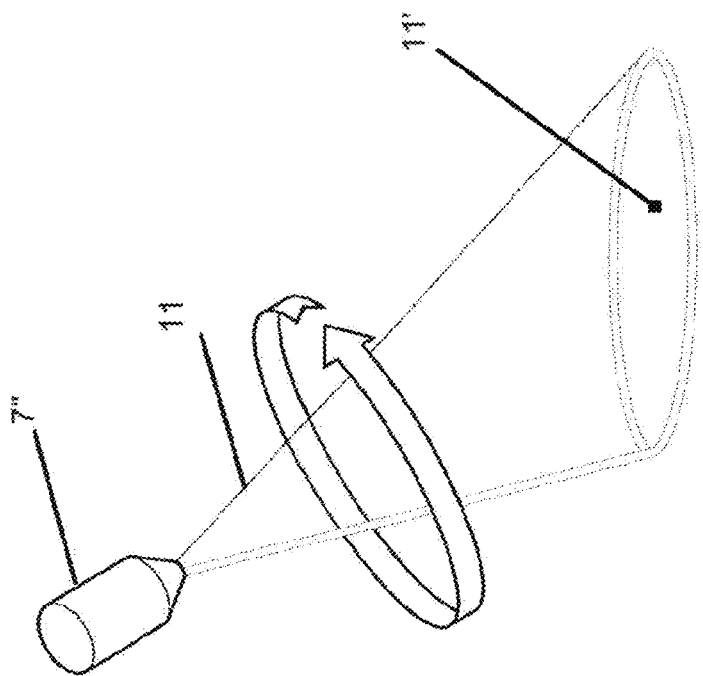
FIG. 17 shows the rotatable nozzle in an inclined position wherein the impact area from the pressurized water on the surface is illustrated.
Figure 16:
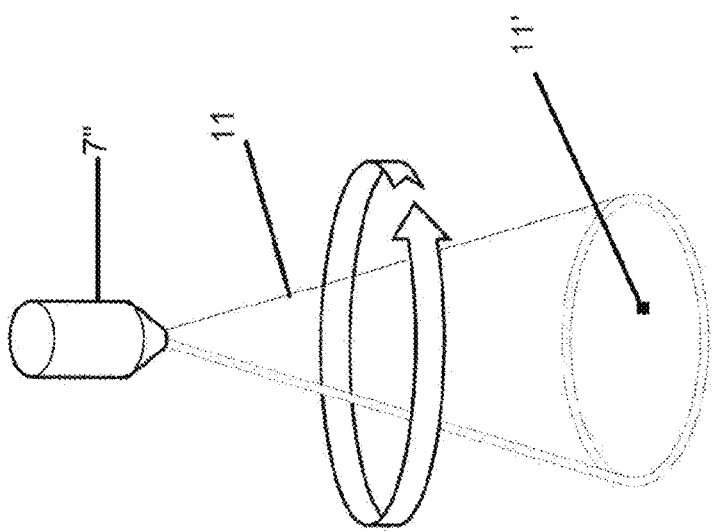
FIG. 16 shows a rotatable nozzle wherein the impact area from the pressurized water on the surface is illustrated.

With reference to FIGS. 13, 14 and 15 a vessel 15' including a preferred embodiment of the device 1' is shown. The device 1' comprises a rig structure 2' mounted in the vessel 15'. The rig structure 2' includes a traverse structure 5'. The traverse structure 5 has an extent smaller than the width of the vessel 15'. The traverse structure 5' is provided with a number of rotatable nozzles 7" for flushing with high pressure water 11 supplied from a high pressure facility 10 located on the vessel 15'. Closely related rotatable nozzles 7" create overlapping impact areas on the surface of the water. The rotatable nozzles 7" are used in a vertical (upright) position as illustrated in FIG. 16. The impact area 11' of the pressurized water forming a circle on the surface of the water. Closely related rotatable nozzles 7" then will form overlapping continuous impact areas on the surface of the water. The nozzle 7" could also be adjusted to an inclined position in relation to the vertical as shown in FIG. 17. In this configuration the nozzle 7" creates an impact area 11' forming an ellipse on the surface of the water.

In operation of the vessel 15' and the device 1' dispersed oil droplets within a micron-size range are obtained such that the dispersed oil droplets can be mixed into the water by the energy created by the water jets and the forward motion of the vessel.

Generally, a man skilled in the art will understand that it is a relation between a required impact energy and oil qualities to be treated. The impact energy must be high in order to disperse oil droplets and the man skilled in the art understands that this requirement (the requirement with regard to high impact energy) increases with increasing viscosity of the oil. The viscosity of the oil increases with several factors according to API-number, the oil's ability to evaporate off the lighter components and the ability of the oil to take up water and create emulsions.

Testing of the device 1' including the rotatable nozzles 7" demonstrates that the distance between the nozzles and the surface of the water does not need to be adjusted. However, in some cases adjusting the distance is advantageously. In an embodiment the distance regulation is solved by a couple of small electro motors raising and lowering the rig structure 2'. In the preferred embodiment of the device 1' the rig structure 2' is arranged in a short distance to the surface of the water and thereby high impact energy is achieved where the pressurized water jets hit the oil spill. Distances between the nozzles and the surface of the water have been tested from 15 to 30 cm. It is found that sufficient effect is achieved for distances between 15 and 30 cm.

One or more types of nozzles could be used. However, testing has shown that only one type of a rotating type nozzle 7' is sufficient in that the narrow jet is "thrown around" such that the impact area creates an ellipse on the surface. The ellipses from the closely related nozzles 7" overlapping each other. Rotational velocity is 3000 rpm for the type of nozzles which are used.

One or several rig structures 2' could be used. Testing has shown that only one rig structure 2' is sufficient in order to treat the oil spill on the surface of the water.

Testing has shown that an increased effect could be achieved by adding "additives" (sand, lime particles etc. increasing the impact energy). However, such additives are not necessary. Slightly better effect is also achieved by using hot water, but normal sea water is sufficient.

The spray nozzle 7" is a key component of the high pressure water jet system.

The size of the spray nozzle outlet as well as its shape affect the amount and type of high-pressure water jet that is directed towards the work area (the oil slick on the surface).

The outlet diameter of the nozzle 7" determines the pressure produced at a particular flow. A smaller outlet will produce a higher pressure at a specific flow than a larger outlet.

The shape of the nozzle 7" outlet determines the spray pattern, which is generally either zero degree spray pattern or fan spray (various degrees) The more concentrated or narrower the spray pattern, the less surface will be covered but with more impact of water against the surface.

Rotating nozzles 7" rotates a zero degree spray pattern in a circular motion to break down the oil on the surface.

The zero-degree water jet beam is spinning at 3000 rotations per minute creating a circular impact area on the surface. By tilting the water jet some degrees from vertical the impact area forms an elliptic shape on the surface. By placing several nozzles 7" close to each other the circular or elliptic impact areas from the neighboring nozzles will overlap and create a continues impact area along the whole length of the nozzle rig. In this way we combine the benefit of using the highly concentrated zero-degree beam with the wider impact area caused by the rotating movement of the beam It is noted that the principle of using high pressure water flushing for dispersing oil is novel and that it leads to a surprising effect in that an oil slick is broken into micron-sized droplets without any use of chemical dispersants.

The dispersion of oil on water using a device according to the present invention is hence very efficient and may replace large parts of current chemical dispersion means.

Conventionally, the treatment of oil spills on water has been carried out by way of chemical dispersion. The formation of droplets smaller than 70 microns has been used as a criterion for successful dispersion treatment. In connection with the present application, extensive testing has been carried out in order to determine whether treatment of surface oil by way of high pressure spraying is sufficiently able to produce droplets meeting the above criterion. The test was carried out in Sintef's meso-scale flume.

The oil was treated using different techniques:
Flushing onto the oil from a height above the water at an angle of 90 degrees.
Flushing onto the oil from a height above the water at an angle of 45 degrees.
Flushing directly into the water at the water surface.

The latter test gave the best measurable result. Droplets having an average droplet diameter of 20 microns were formed, and only small amounts oil were observed to make it through the system without being treated. The two tests involving application of treatment from a height above water did not yield measurable results. Also, the pressure used in these tests was limited by the insufficient dimensions of the particular testing tank used.

Conventionally, dispersant has been used in oil spill incidents (catastrophes) in order to improve the breakdown of the oil into small droplets. The smaller droplets will assist in removing the thick oil slick by diluting and dispersing the oil slick. Experience from field testing has indicated that the mechanical handling of oil may provide for sufficient shearing of the oil to disperse the oil from the sea surface.

The use of chemical dispersion of oil on water is restricted by local regulations, the availability of chemicals, the efficacy of chemicals on the oil grade in question, as well as the application technology available. The present methodology provides for a chemical-free solution for dispersing oil on water by using an ultra-high pressure water jet solution applicable for small, medium, and large oil and chemical spills. The use of chemical dispersing agents is presently one of the main countermeasures against oil spills. Today, no non-chemical method exists that is applicable for dispersing oil on water.

Some important facts regarding the use of chemical dispersing agents;
The use of chemical dispersion of oil and water is controversial.
The use of chemicals is limited by the availability thereof.
Large amounts of dispersant may be applied in an oil spill emergency operation.
The cost of the chemical dispersant is another problem, with a cost per liter of more than NOK 30.
During the accident in the Gulf of Mexico about 7000 metric tons of chemicals were applied to the oil slick.
The efficacy of chemicals on the oil grade in question as well as the available application technology is a limiting factor.

A pilot project was carried out with the aim of testing the concept and documenting the feasibility of the concept. The present concept has been developed subsequent to two prior projects for the oil industry and the Research Council of Norway.

Limited research has been conducted in order to evaluate the feasibility of using high pressure nozzles as a means of dispersing oil from the sea surface. Initial testing was performed in a small plexiglass tank to document the ability of the nozzles to produce droplets of a desired size. A series of large scale tests was carried out in order to study the efficacy of different oil treatment techniques involving high pressure flushing.

In all tests, the droplet size distribution was monitored using the instrument LISST 100X (Sequoia Scientific). The instrument uses laser diffraction in the determination of the size distribution. The droplet sizes are classified as concentrations within 32 size bins from 2.5 to 500 microns.

The oil used is a lightly evaporated asphaltenic north sea oil.

Flushing was effected by flushing nozzles (Washjet HSS 1/4MEG 2506 from Spraying Systems Company), which created a fan-shaped flushing jet with an angle of 29 degrees. Pressurized water was supplied by a Kärcher HD 10/25 high pressure cleaner. The pressure was controlled by a needle valve and measured by a manometer located just before the nozzle(s).

Figure 5:
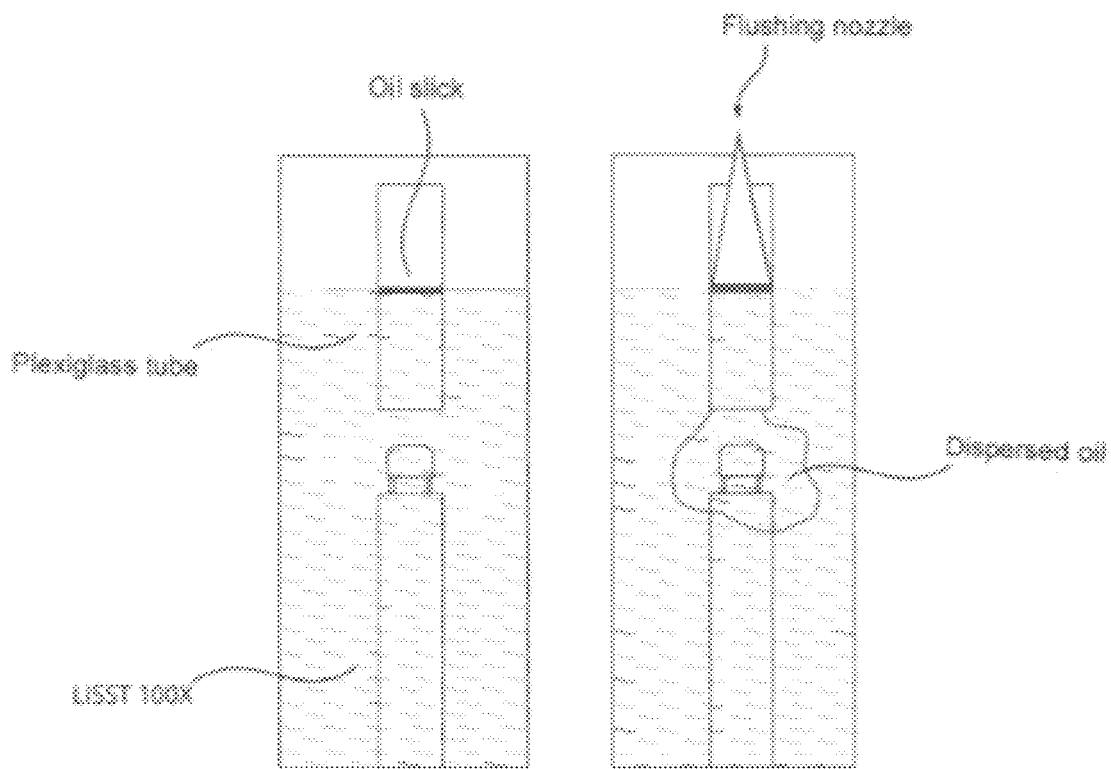

Initial testing was carried out in a small plexiglass tank (diameter=40 cm, height=100 cm) in order to document the ability of the nozzles to produce drops lets of the desirable size. An oil layer of 1 mm 1 mm was contained within a plexiglass tube having a diameter of 10 cm. Flushing was conducted through a nozzle at about 15 bar on the inside of the tube. The small droplets formed escaped below the tube and into the testing tank. The measurement system for LISST 100X was positioned right under the tube, in order to document the size distribution of the droplets formed. In this regard, reference is made to FIG. 5.

Figure 6:
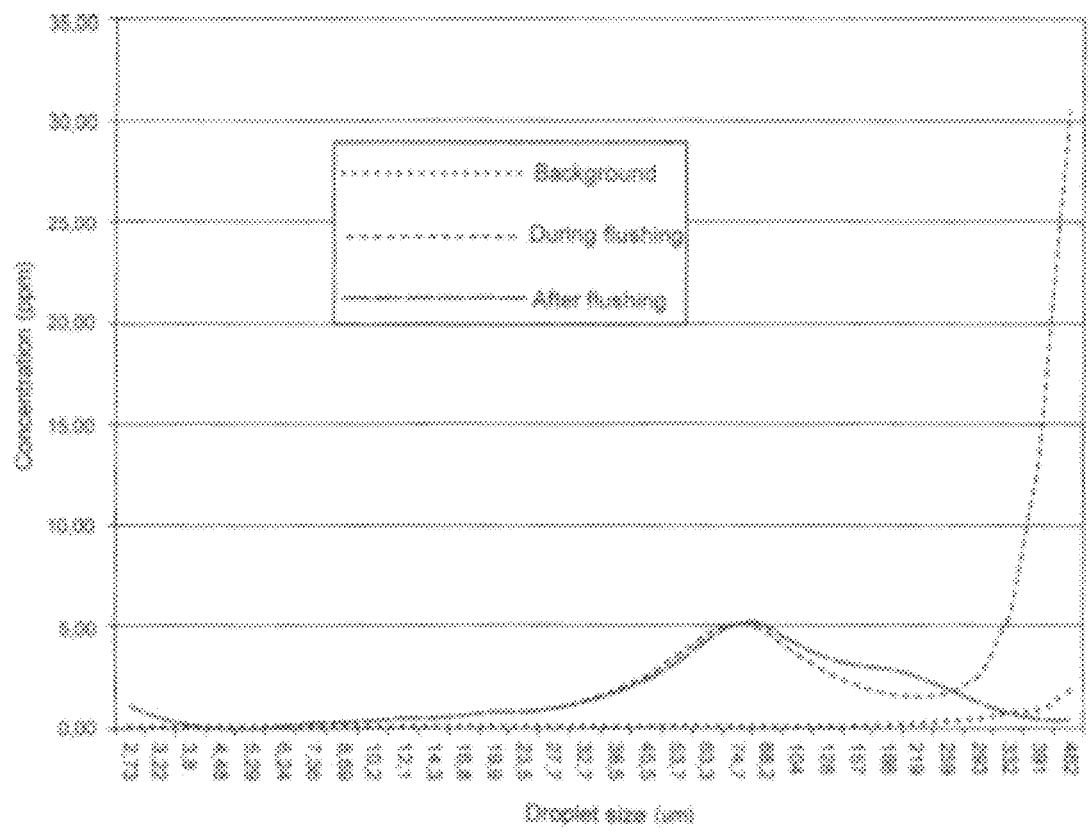
FIG. 6 shows the droplet size distribution in the plexiglass tube experiment before, during and after a high pressure flushing treatment.

Even though the oil was confined within the plexiglass tube, the oil was pushed around on the surface by the flushing treatment. This rendered difficult the quantitative dispersion of the oil, and most of the oil still remained on the surface after the test. Enough droplets were formed to document that the energy of the system was sufficient to produce droplet sizes within the definition of dispersed oil (approximately 70 microns). The resulting droplet size distribution is shown in FIG. 6.

Figure 7:
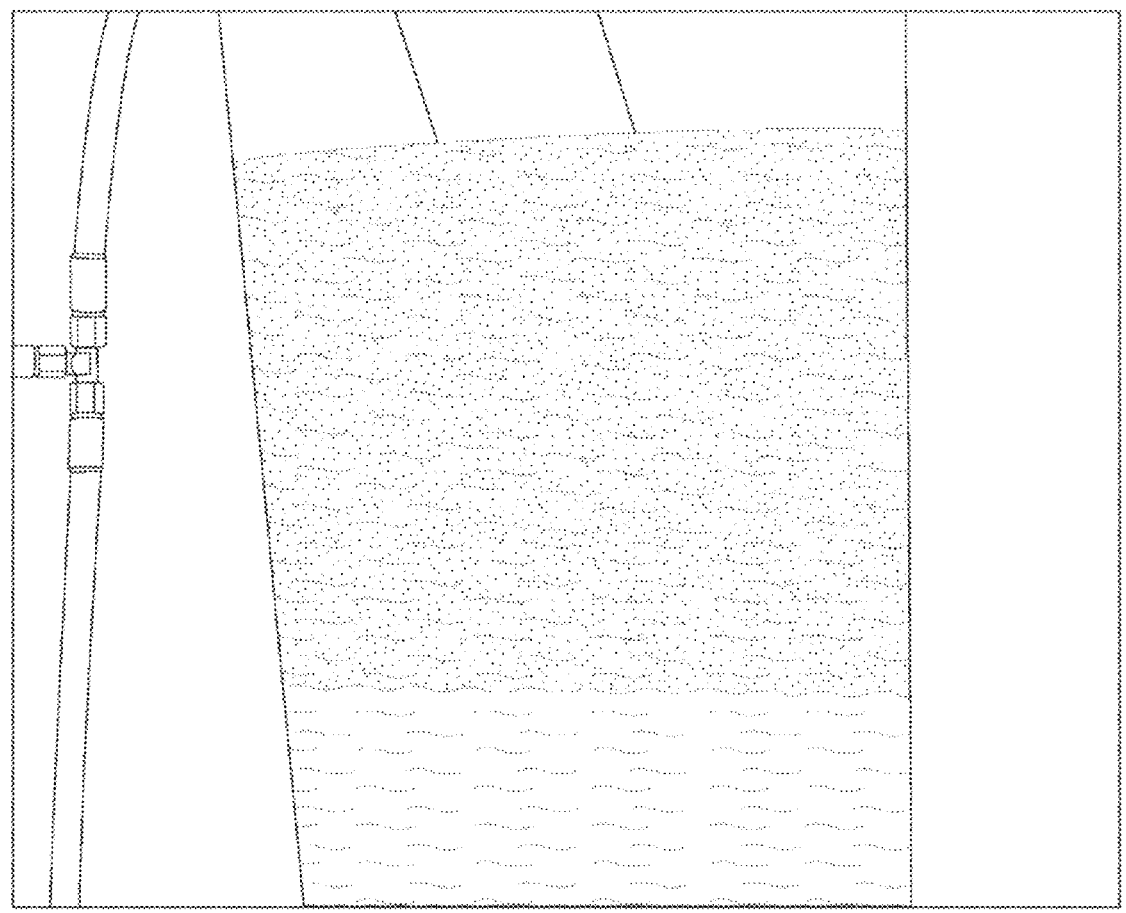
FIG. 7 shows a droplet cloud formed during treatment of the oil by a high pressure jet in the plexiglass tube experiment, FIG. 8 schematically shows a meso-scale flume, with test data indicated in the square.

The result shows a binominal droplet distribution during the flushing treatment. The large droplets with a peak value above the detection limit of the instrument (>500 microns) are most likely a combination of entrained air bubbles and oil droplets that have not been effectively processed in the high pressure flushing treatment. As the flushing is started, the larger droplets are precipitated and leave only a smaller of the two distributions in the water column. The droplets left in the water after the treatment exhibit a wide droplet size distribution with a peak value of approximately 75 microns. The distribution documented was visually evaluated to be dispersed oil, cf. FIG. 7.

Three larger tests were carried out in order to study the efficiency of different oil treatment techniques.
1) Application at an angle of 90 degrees from a height of 50 cm;
2) Application at an angle of 45 degrees from a height of 25 cm; and
3) Application at an angle of 90 degrees at water surface level.

Figure 8:
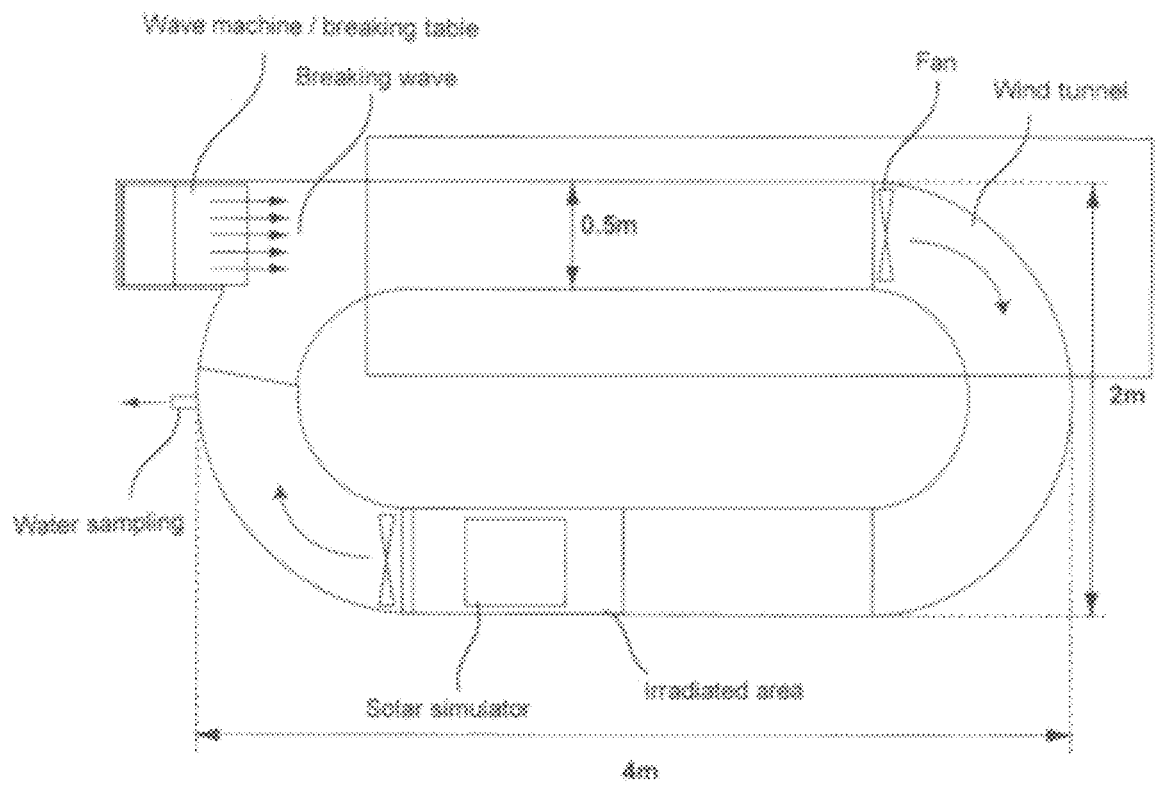

All tests were performed in Sintef's meso-scale flume. A schematic drawing of the flume is shown in FIG. 8.

The flume basin has a width of 0.5 meters and a depth of 1 meter and the overall length of the flume is about 10 meters. The total volume of the tank is 4.8 cubic meters of sea water. Two fans disposed in a covered wind tunnel control the wind velocity. A wave generator is used for generating waves of a controlled wave energy input. The tests were carried out in front of the wave generator and droplet size measurements were taken just inside the first tank of the test tank. The testing region is indicated by the square in the figure.

Two flushing nozzles were mounted side by side at a distance 50 cm above the water surface in the test tank. At this height, the nozzles produced a continuous flushing line across the width of the tank. The three experiments are described separately below.

Application at an Angle of 90 Degrees from a Height of 50 cm

The nozzle pair was positioned 50 cm above water level and worked perpendicularly to the axis. Water was supplied at a pressure of up to 20 bar. In this regard, reference is made to FIGS. 9a and 9b.

An amount of air was entrained into the water as the jet hit the surface. A surface current was carried up by the jet itself, and as a result of resurfacing of the air bubbles. The current generated was stronger than the wind/wave induced currents in the test tank and the oil was not able to passively pass through the water jet. Attempts were made to capture the oil between the two barriers and to move the nozzles through the oil spill. This was a more successful approach, but a portion of the oil was still pushed away by the surface current induced. Due to the high energy in the water surrounding the jet, large droplets were also mixed into the water, but were immediately carried to the surface on exit from the turbulent area during the flushing. When a high concentration of small droplets is formed, a light brown cloud is assumed to form in the water. The formation of a droplet could not be observed visually in this experiment. LISST 100X was not able to detect elevated droplet concentrations that could be discerned from the background noise in the test tank.

Application at an Angle of 45 Degrees from a Height of 25 cm

The nozzle pair was positioned 25 cm over water level and worked at an angle of 45 degrees to the surface. At half the angle and half the height, the flushing still produced a continuous flushing line spanning the width of the test tank. The angle was changed in order to address the problem of counteracting currents. The jet worked more in the direction of the wind/wave induced currents and the air bubbles surfaced further away from the jet. Also, at the 45 degrees angle, the flushing treatment (jets) was observed to "bounce off" the surface instead of penetrating the surface. This means that part of the energy was converted to a horizontal and upward movement. The flushing pressure was limited to 16 bar in order to reduce the amount of water flushed back into the air. In this regard, reference is made to FIG. 10a and FIG. 10b.

Some turbulence still formed in front of the water jet. This turbulence prevented the oil from passing through when no wind or wave action was applied. As the wind and the wave generators were turned on, the oil moved slowly into the jet. Some of the oil was immediately converted to a brownish cloud when it passed through the jet. Most of the oil, however, passed through the jet as spots on surface oil or as large droplets. LISST 100X was not able to detect elevated droplet concentrations that could be discerned from the background noise in the test tank.

Application at an Angle of 90 Degrees at the Water Surface Level

Figures 11A, 11B:
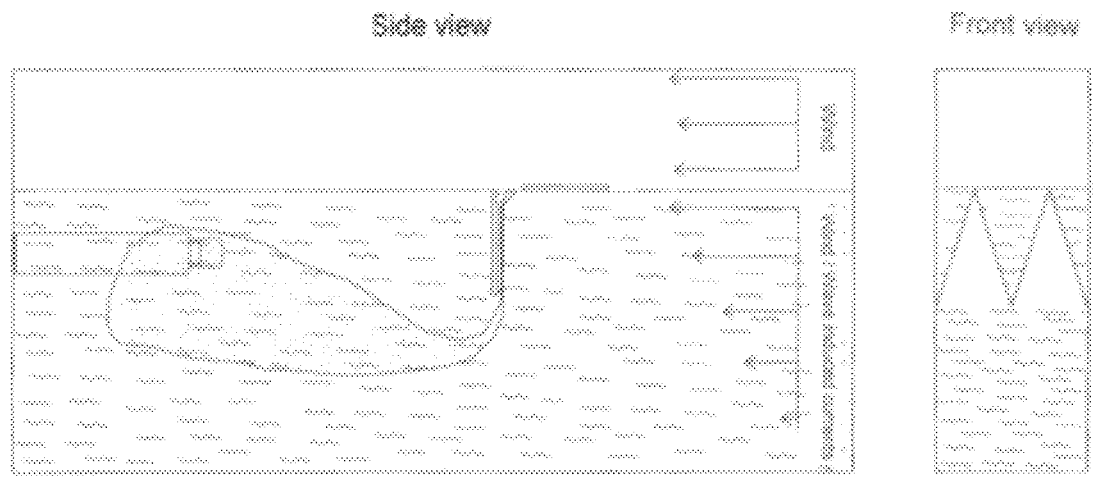
FIG. 11b shows a front view of FIG. 11a, FIG. 12 shows the droplet size distribution before, during and after the treatment of oil by nozzles positioned at the water surface in the flume testing tank.

In order to minimize the air entrainment and to maximize the energy transferred into the water, the system was positioned at the water surface so as to flush down into the water at an angle of 90 degrees. The reduced height also allowed the use of a higher pressure so the system was operated at 35 bar. In this regard, reference is made to FIG. 11a and FIG. 11b.

Figure 12:
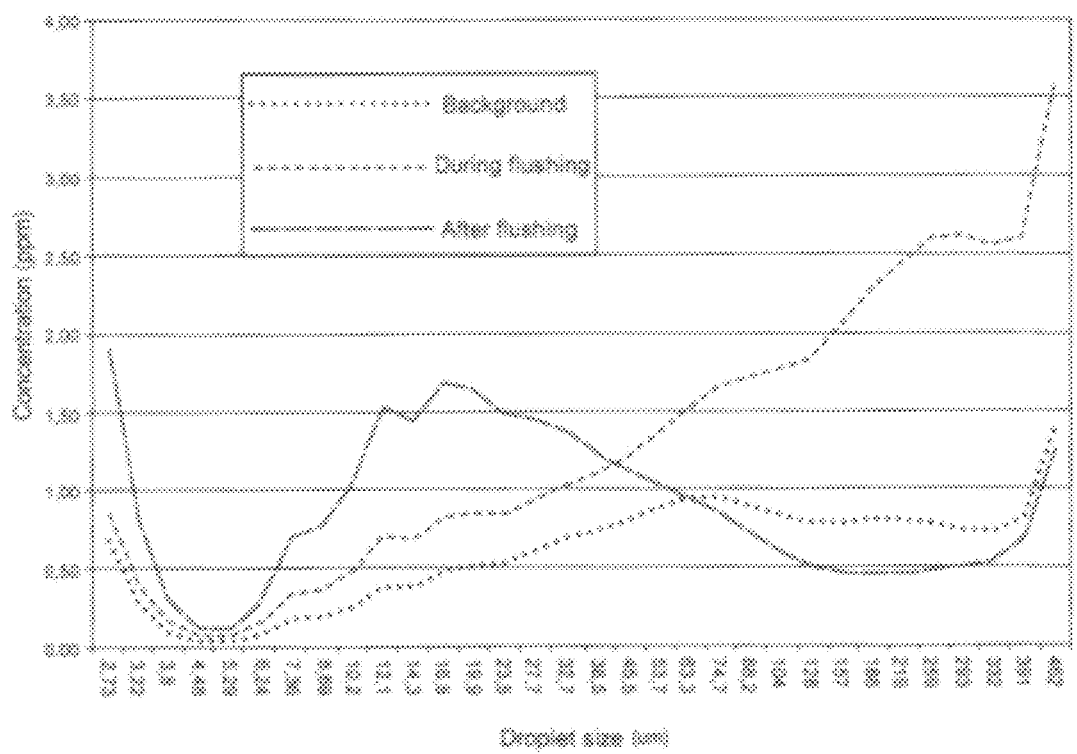

The nozzle system was arranged at the water surface and oil flow, therefore, was prevented by the application system itself. Consequently, oil was concentrated upstream of the nozzles. After the high pressure flushing was activated, parts of spots were pulled into the two jets. Only small amounts of oil were observed to pass through the system without being "treated" by the high pressure jet. The formation of light brown clouds could be observed immediately when the oil entered into the system. This observation could also be documented by measurements using LISST 100X, cf. FIG. 12.

During the treatment with high pressure flushing, the droplet size distribution has a peak above the detection limit of LISST 100X. This is assumed to be mainly due to the air bubbles entrained in the water. After the flushing was stopped, the large droplets were precipitated and a distribution having a maximum diameter of 20 microns was left in the water.

LISST 100X does not discern between oil droplets and water bubbles. Therefore, a water sample was obtained subsequent to the flushing treatment in order to document that the concentrations measured were actually oil. The samples were extracted and analyzed for total oil in a spectrometer. The concentration was found to be 38 ppm. The net concentration measured by LISST 100X was 29 ppm (sum of the concentration within all the reported size bins). This indicates that most droplets registered by LISST are oil droplets.

A limited number of treatment methods for treating surface oil by way of high pressure flushing were tested in the channel test tank.

Flushing directly into the water at a pressure of 35 bar resulted in the best documented effect. Only small amounts of oil were observed to make it through the system without being treated by the jet. Droplets formed following the flushing treatment were measured to have a mean volume distribution of 20 microns. As mentioned earlier, a typically used criterion for the success of a dispersion operation (treatment with chemicals) is the formation of droplets having an average droplet diameter of less than 70 microns.

Flushing from a distance above the water surface resulted in the entrainment of an amount of air bubbles in the water. The air bubbles that returned to the surface together with the energy from the flushing induced an outwelling current that helped push the oil away from the flushing line. This problem was partially addressed by applying the flushing treatment at an angle. Application at an angle made it easier to have the oil enter into the flushing line. The angle of 45 degrees, however, made the flushing treatment "bounce off" of the water surface and a portion of the downward acting force from the jet was lost. The meso-scale flume turned out to be under-dimensioned for this type of testing. Both tests involving application from a height had to be carried out at a limited pressure, in order to avoid damaging equipment in the testing tank.

The experiments led to the following key conclusions:

It is possible to efficiently disperse oil by using a high pressure water jet system.

The final configuration of the system can be further developed.

It is necessary to study the impact of different types of oil and weather conditions, but it is assumed that such factors will be of less importance here than with the alternative technique using chemical dispersants.

The system may be incorporated into different oil spill control systems (small/large scale, small/large vessels).

Based on the studies conducted, the prerequisites for the proper operation of chemical-free high pressure water jet systems are the following:

1) It is necessary that the system delivers an ultra-high pressure water jet, preferably above 30-40 bar per nozzle. This places strict requirements on the high pressure water supply system as well as the design of the nozzles as well as the internal configuration of the individual nozzles.

2) It is necessary that the water fan from each nozzle is concentrated in order to reduce the amount of air pulled down together with the water jet.

3) It is necessary that the nozzle outlet is located near the water surface. 0-20 cm would be desirable, but the distance can be increased if the water pressure is increased and/or the concentration of water jets is increased (narrow fan). The closer to the surface the water fan is, the wider it can be, and it has been found that it is possible to tune the combination of surface distance and water fan (jet) width.

4) In order to be able to cover a large surface area, the nozzle should be arranged in a stand that allows a certain width of water to be covered as the so vessel carrying the system moves through the oil slick on the surface.

The invention claimed is:

1. A device for dispersing oil on water, comprising:
a rig structure for being mounted in a vessel, the rig structure including a transverse structure with nozzles for flushing with pressurized water jets supplied from a pressure facility located on the vessel,
wherein a direction and a distance of the nozzles to a surface of the water as well as pressure of the pressurized water are adjustable,
wherein the nozzles are rotatably arranged whereby overlapping impact areas from closely related nozzles are formed on the surface of the water, whereby dispersed oil droplets within a micron-size range are obtained such that the dispersed oil droplets can be mixed into the water by the energy created by the water jets and forward motion of the vessel.

2. The device of claim 1,
wherein the impact area from the pressurized water on the surface of the water forms an circle on the surface of the water overlapping closely related nozzles.

3. The device of claim 1,
wherein the impact area from the pressurized water on the surface of the water form an ellipse on the surface of the water overlapping closely related nozzles.

4. The device of claim 1,
wherein the nozzles are rotated by a velocity of at least 3000 rpm.

5. The device of claim 1,
wherein the distance of the nozzles to the surface of the water is between 15 and 30 cm.

6. The device of claim 1,
wherein the flushing is carried out at a pressure of at least 35 bar per nozzle.

7. The device of claim 1,
wherein the pressure facility uses water from a surrounding body of water.

8. The device of claim 7,
wherein the surrounding body of water is seawater.

9. The device of claim 7,
wherein the surrounding body of water is freshwater.

10. The device of claim 1,
wherein the rig structure is connected to an additive storage tank.

11. The device of claim 10,
wherein additives are provided directly from the additive storage tank into the pressurized water for the nozzles.

12. The device of claim 10,
wherein additives are provided directly from the additive storage tank to separate additive nozzles on the front transverse structure.

13. The device of claim 10,
wherein additives in the additive storage tank are at least one of: particles, bacteria, nutrients, and chemicals.

14. The device of claim 1, wherein the rig structure is mounted in a front part of the vessel.

15. A method of dispersing oil on water, comprising:
mounting a rig structure in a vessel, wherein the rig structure includes a front transverse structure with rotatable nozzles for flushing with pressurized water jets supplied from a pressure facility located on the vessel, adjusting a direction and a distance of the nozzles to the a surface of the water as well as pressure of the pressurized water,
maintaining highest possible impact energy from the pressurized water on the surface in relation to the viscosity of oil, and
obtaining dispersed oil droplets within a micron-size range such that the dispersed oil droplets are mixed into the water by the energy created by the water jets and forward motion of the vessel.

16. The method of claim 15, wherein the rig structure is mounted in a front part of the vessel.

* * * * *